United States Patent [19]

Strickland

[11] Patent Number: 5,231,393
[45] Date of Patent: Jul. 27, 1993

[54] MOBILE SPEED AWARENESS DEVICE

[75] Inventor: Bill F. Strickland, Woodland, Calif.

[73] Assignee: P.A.T., Co., Lenexa, Kans.

[21] Appl. No.: 259,207

[22] Filed: Oct. 18, 1988

[51] Int. Cl.5 ............................................. G08G 1/01
[52] U.S. Cl. ................................... 340/936; 340/905; 340/908; 340/933
[58] Field of Search ............... 340/936, 937, 933, 907, 340/908, 908.1, 928, 431, 429, 905; 342/104; 280/491.2, 491.5

[56] References Cited

U.S. PATENT DOCUMENTS

| | | |
|---|---|---|
| Re. 23,403 | 9/1951 | Barker . |
| 2,284,850 | 6/1942 | Smith . |
| 2,325,435 | 7/1943 | Sykora . |
| 2,620,470 | 12/1952 | Rather et al. . |
| 3,544,958 | 12/1970 | Carey et al. . |
| 3,618,003 | 11/1971 | Marshall . |
| 3,626,413 | 12/1971 | Zachman . |
| 3,680,043 | 7/1972 | Angeloni . |
| 3,729,706 | 4/1973 | Hein ..................................... 340/908 |
| 3,961,323 | 6/1976 | Hartkorn ........................ 340/429 X |
| 3,983,531 | 9/1976 | Corrigan . |
| 4,173,010 | 10/1979 | Hoffmann . |
| 4,269,429 | 5/1981 | Eichstadt ..................... 280/491.2 X |
| 4,292,627 | 9/1981 | Knight ................................. 340/908 |
| 4,361,342 | 11/1982 | Duffield .......................... 280/491.5 |
| 4,535,331 | 8/1985 | Koenig ................................ 340/908 |
| 4,543,905 | 10/1985 | McKenney ..................... 340/908 X |

FOREIGN PATENT DOCUMENTS 2601144  1/1988  France ............................... 342/104

OTHER PUBLICATIONS

"How Fast are You Driving?" *Electronic Design* 6, (Mar. 15, 1978).

Primary Examiner—Jin F. Ng
Assistant Examiner—Brent A. Swarthout
Attorney, Agent, or Firm—D. A. N. Chase; Michael Yakimo, Jr.; Richard P. Stitt

[57] ABSTRACT

A speed awareness device for allowing passing traffic to perceive from a source other than their own speedometers their true speed. A trailer supports a container within which a radar source is contained operatively connected to a display panel. A suitable source of power operates the radar and display and includes a battery, an optional photo voltaic source to power the battery and a plurality of instrumentalities to preclude or render less likely that the trailer will be moved by unauthorized personnel. These instrumentalities include a removeable trailer hitch, an axle lock, support stands for elevating the trailer and an internal alarm system.

20 Claims, 5 Drawing Sheets

FIG. 9

MOBILE SPEED AWARENESS DEVICE

FIELD OF THE INVENTION

The following invention relates generally to a device which displays the speed of an object passing by a speed sensing station. More specifically, this invention relates to a display which communicates to a driver the velocity of his car passing through a speed sensor such as a radar gun.

BACKGROUND OF THE INVENTION

The motivations for people who exceed the speed limit are probably wide-ranging and difficult to categorize. Nevertheless, it is believed that a relatively large number of people who exceed the posted speed limits do so through inadvertence, distraction or preoccupation from other stimulus. Many drivers who exceed the speed limit still maintain a keen ability to observe activities in progress outside the vehicle and in the direction that the vehicle is traveling. Indeed, some individuals who intentionally exceed the posted speed limit may be exercising more intense visual scrutiny to avoid apprehension by police.

Even though vehicles are equipped with speedometers, constant obsessive monitoring of the speedometer may divert the driver's attention from reacting to stimulus while driving. Moreover, speedometer error may account for some percentage of non-compliance with the posted speed limit.

While apprehension of people who exceed the speed limit may be a source of some revenue for governmental entities, compliance with the posted speed limit is the true objective. General compliance by the populous would allow the available police manpower to be reallocated to other areas.

Examples of areas where compliance with the posted speed limit would decrease the hazards of excessive speed include school zones and populated areas which are the site of frequent vehicular mishaps.

The following patents reflect the state of the art of which applicant is aware and is included herewith to discharge applicant's acknowledged duty to disclose known art:

| | |
|---|---|
| Re.23,403 | Barker |
| 2,284,850 | Smith |
| 2,325,435 | Sykora |
| 2,620,470 | Rather |
| 3,054,087 | Clegg |
| 3,544,958 | Carey |
| 3,618,003 | Marshall |
| 3,626,413 | Zachmann |
| 3,680,043 | Angeloni |
| 3,983,531 | Corrigan |
| 4,173,010 | Hoffmann |

The Barker patent has an electrical means which uses UHF waves to measure the speed.

The 1943 Smith patent uses a threshold setting which activates a circuit to indicate when the preset speed has been exceeded. It is a no-go circuit. The invention resides in the electronics of the device.

Sykora discloses the concept of having a sign indicating the speed of the driver. Here a car makes contact at a first point to start a timer. Then after he makes a contact with the second device, it starts a circuit which is keyed to the speed whereby a particular contact on a timer is energized so as to display the actual speed of the vehicle. This information is transmitted to a sign and a light correlated to the specific contact of the timer is actuated to display the speed of the vehicle. See FIG. 4.

Rather is cited as of interest only. A specific circuit utilizes an audio signal (namely the doppler effect) for traffic system control.

Clegg is a traffic warning system, and it is seen that it suggests the use of solar cells to charge the battery for the speed indicator system. See column 3 line 29 et. seq. Also note FIG. 2A and 2B. These have indicia that light up when the predetermined speed is exceeded. See FIG. 1 for the placement of this sign by the side of the road.

Another device that utilizes a sign is disclosed in Carey. Here the speed in digitized form is displayed on a sign.

The Marshall patent is one that relates to interval detection and signalling i.e. to determine when one car is too close to another. Note for instance FIG. 2.

Zachmann uses a system for the counting of cars by measuring the time delay between two or more indicators. It uses the doppler pulse interval as a monitoring technique.

Angeloni is a central station system and is cited as of interest. It requires special equipment for the monitoring program thereof.

Yet another vehicle responsive signaling means is set forth in Corrigan. This is a sign that provides primarily a yea/nay system. Various types of indicia may be utilized such as an audible signal as well as illumination.

Hoffmann shows the concept of using a timer, batteries and charger in conjunction with a speed indicator system. Here the batteries and charger are tied to a movie camera. Note further, the purpose of this invention is for education rather than for ticket giving.

SUMMARY OF THE INVENTION

While the instant invention shares some coincidental similarity with certain aspects of the noted prior art, no patent teaches singularly nor in concert with any other patent the entire system according to the present invention which provides ease of use and flexibility.

More specifically, most installations in the known prior art are fixed. It should be appreciated that many vehicles habitually travel along the same routes. Thus, the value of providing a device which indicates the speed of a vehicle to a driver decreases after the device has been in place for some time.

Conversely it has been observed that there is a residual effect in once having monitored a certain location. Drivers passing through an area which has once been monitored tend to adhere to the speed limit for sometime thereafter. Thus, the relative utility of permanent emplacement with such a device in a given location has a diminishing benefit.

The instant invention is distinguished over the known prior art in that it is readily transportable to another site after substantial compliance exists in an area that has used the instant invention. Moreover, the instant invention allows rapid deployment in areas which experience increased temporary traffic patterns, such as during special events or road construction to provide immediate compliance with the posted speed limit as needed.

A second feature which distinguishes the invention over the known prior art includes the observation that the device is structured to allow not only the rapid deployment of the device, but also by one who needs very little training in its deployment. The system delineated infra can be expeditiously deployed by persons having a relatively modest skill level especially since the system is not "hard wired" to any particular situs.

An ancillary benefit involves a construction technique which allows the structure to be relatively impervious to the ravages of vandalism when the unit is deployed for an extended period of time. Unlike most of the prior art, where fixed site installation increases the likelihood the deployed devices will fall to the predations of vandals, the device according to the instant invention may either be equipped with sensors which are activated in the presence of vandalism or alternatively, allow the device to be removed to a less hostile area before any such attempted destruction is likely to occur. One hallmark of the construction technique associated with the instant invention is the combined mobility and structural durability to thwart all but the most determined efforts of vandals.

A further distinguishing feature over the known prior art includes flexibility in design of the device. More specifically, the instant device is configured in such a way that it can be tailored to various and diverse needs by differing law enforcement requirements. Thus, in its elemental form, the device includes a rugged exterior shell which can be readily transported within which a commercially available radar gun is supported and capable of reorientation for aiming the gun as desired. An on-board power system is operatively coupled to the radar and communicates with a visual display which faces oncoming traffic providing a visual indicator of the true speed of the passing vehicle to the driver.

Moreover, the device can include a sign which indicates the posted speed limit for the particular road. This sign is easily changeable to accommodate different road speeds. The device can also include a motion detector or other type of sentry sensor which monitors activities by vandals which, when once enabled, triggers an alarm or other type of warning. The device may also include a recorder which can provide a record of miscreant behavior. The device can also include a means for replenishing the on-board power, such as a solar collector. The device can also include illumination for nighttime use.

OBJECTS OF THE INVENTION

Accordingly, it is a primary object of the instant invention to provide a novel and useful speed awareness device according to the present invention.

It is yet another object of the present invention to provide a device as characterized above which is extremely durable in construction, safe to use and lends itself to mass production techniques.

A further object of the present invention is to provide a device as characterized above which provides stimulus for drivers of vehicles passing by the device alerting them of their speed.

A further object of the present invention is to provide a device as characterized above which increases the likelihood of compliance by motorists of the posted speed limit on various roadways.

A further object of the present invention is to provide a device as characterized above which is imminently transportable to various sites requiring a minimum amount of skill in deployment as well as a minimum amount of time associated therewith whereby the device can be transported and redeployed as necessary on short notice.

A further object of the present invention is to provide a device as characterized above which is extremely flexible in its construction so that various options and instrumentalities can be incorporated therewithin to provide custom tailoring for the specific needs of a given traffic situation.

Another object of the present invention is to provide a device as characterized above which alters the behavior of motorists passing by the device to promulgate compliance with the local speed limit.

It is yet a further object of the present invention to provide a device as characterized above which enhances the protection afforded pedestrians and other traffic.

Viewed from one vantage point, it is an object of the present invention to provide a velocity indicator which includes:

a container having an access portal, a display board mounted on a window in an interior of the container with a display face exposed to an exterior of the container through the window, a velocity sensing instrumentality mounted near the display board and monitoring passing traffic through a container transparency, and a source of power coupling the sensing instrumentality to the display board to exhibit sensed velocity to the traffic being monitored.

Viewed from another vantage point, it is an object of the present invention to provide a speed monitoring and display system which includes:

a wheeled trailer which supports a container thereon, a display board on a trailing portion of the container providing a readout of passing traffic speed to passing drivers, a radar gun monitoring passing traffic and operatively coupled to the display, and a source of power to drive the radar and display board.

Viewed from yet a third vantage point, it is an object of the present invention to provide:

a mobile speed awareness device which includes a trailer supporting speed indicating instrumentality which apprises passing traffic of traffic speed, a posted speed limit sign which removeably connects to the trailer, a trailer tongue removeably connected to the trailer, and a free-standing instrumentality for temporarily immobilizing the trailer in one location.

These and other objects will be made manifest when considering the following detailed specification when taken in conjunction with the appended drawing figures.

BRIEF DESCRIPTION OF THE PREFERRED EMBODIMENT

Referring to the drawings now, wherein like reference numerals refer to like parts, reference numeral 10 is directed to the mobile speed awareness device according to the present invention.

In its essence, the speed awareness device 10 is formed from a trailer 20 having a tongue 30 at a forward most portion which allows the trailer frame to be coupled to a prime mover, a container 50 supported on the trailer frame, a display board 90 on a trailing portion of the container, a photo voltaic panel 100 which can be deployed on a top most surface of the container 50, all to be used in concert with a radar gun 84 contained within the interior and obtained from known commercial radar gun manufacturers. The radar gun 84 and the display board 90 along with the photo voltaic panel are all operatively coupled by means of a circuit 70 to be described.

More specifically, the device 10 includes a trailer frame 20 and its associated running gear formed in the following illustrative manner. With reference to FIGS. 1 through 4, the trailer frame 20 is formed with a pair of axle supporting box beams 2 which extend along the longitudinal aspect of the trailer frame 20 on outboard edges thereof. See FIG. 4. In addition, transverse beams 4 are located above the box beams 2 and extend laterally outwardly beyond the container 50 and support fenders 6 in depending relationship thereto. Both the transverse beams 4 and box beams 2 are secured to the container in a manner to be defined. In essence, both box beams support an underlying transversely disposed axle 8 having free ends which in turn support a torsion bar suspension system 12 which in turn are coupled to wheels 14 at outboard ends thereof. The wheels 14 allow the device to trail behind a prime mover such as a police car when being transported. When the device 10 is to be deployed in a fixed location, an axle lock 16 can be interposed between spokes of the wheels carrying the tires thereon. The axle lock 16 can include a padlock 18 at one extremity whereby rotation of the wheels 14 is limited to the extent that the axle lock 16 abuts against the torsion bar suspension system 12 and axle 8.

Figure 3:
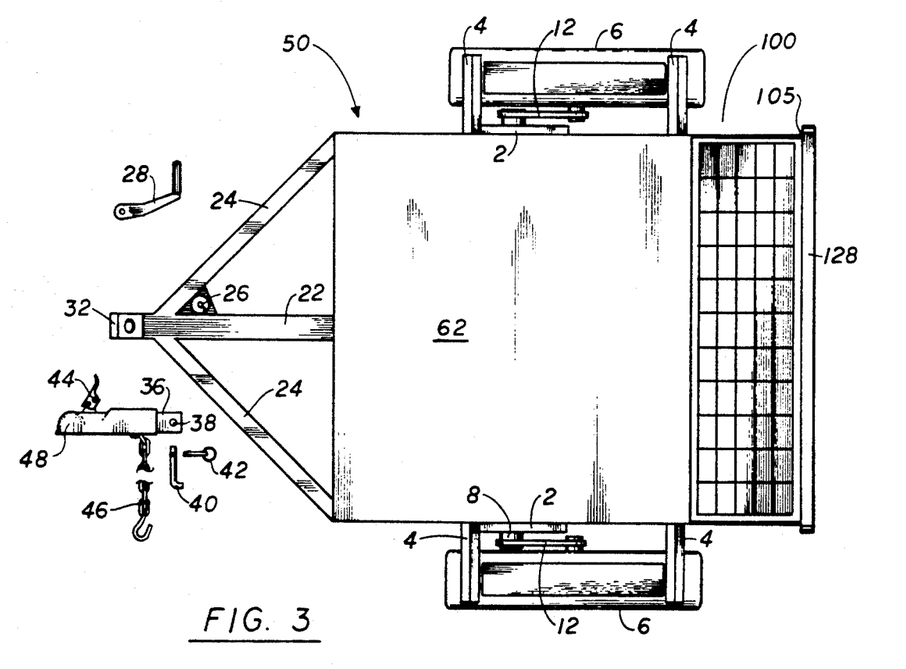
FIG. 3 is a top plan view of the apparatus according to the present invention which schematically depicts certain removable parts associated with trailering the device.

FIG. 3 shows a longitudinally extending central tongue brace 22 positioned forwardly of the trailer. Angled braces 24 extend from a forward most portion of the central tongue brace 22 rearwardly and communicate with lower most corners of a forward face of the trailer to be described herein after. Collectively, the angle braces 24 and tongue brace 22 support an outwardly and forwardly directed tongue 30 which can be coupled to a police car for example for towing the device. When the device is to be held stationery at a given site, an operative portion of the tongue 30 is removed and the trailer is supported at the forward end by means of a telescoping stand 26 having a removable crank handle 28 at a top most end. By cranking the handle 28, the telescoping stand 26 can extend or retract along the direction of the double-ended arrow A to allow the forward portion of the trailer frame to be free-standing and supported solely by the telescoping stand 26. The crank handle 28 is removable from the stand 26 either by a socket-type connection or a retaining pin (not shown) to thwart manipulation by unauthorized person. Note that the telescoping stand 26 is supported along the intersection of one angled brace 24 and the central tongue brace 22 as shown in FIG. 3, on a gusset extending therebetween.

With respect to tongue 30, as mentioned supra, it is removable to preclude unauthorized hitching of the device 10, making the device more difficult to steal. In essence, the tongue 30 includes a socket 32 formed at a free end of the extension of the tongue brace 22 which is adapted to receive therewithin a complimentarily formed sleeve 36 to telescope therewithin. The sleeve 36 is retained within the socket 32 by means of a lockpin 40 passing through registering eyelets 38 passing through both the socket 32 and the sleeve 36. The lockpin 40 can be fixed in position for towing by means of a retention clip 42. A forward portion of the tongue 30 includes a hitch locking mechanism 44 of conventional known manufacture. Comparing FIGS. 2 and 3, rotation of the hitch 44 along the direction of the arrow B will lock a ball (not shown) within a ball receiver 48 fashioned on a bottom surface of the tongue 30. In addition, a safety chain 46 connects the tongue to the towing vehicle for additional safety.

Figure 1:
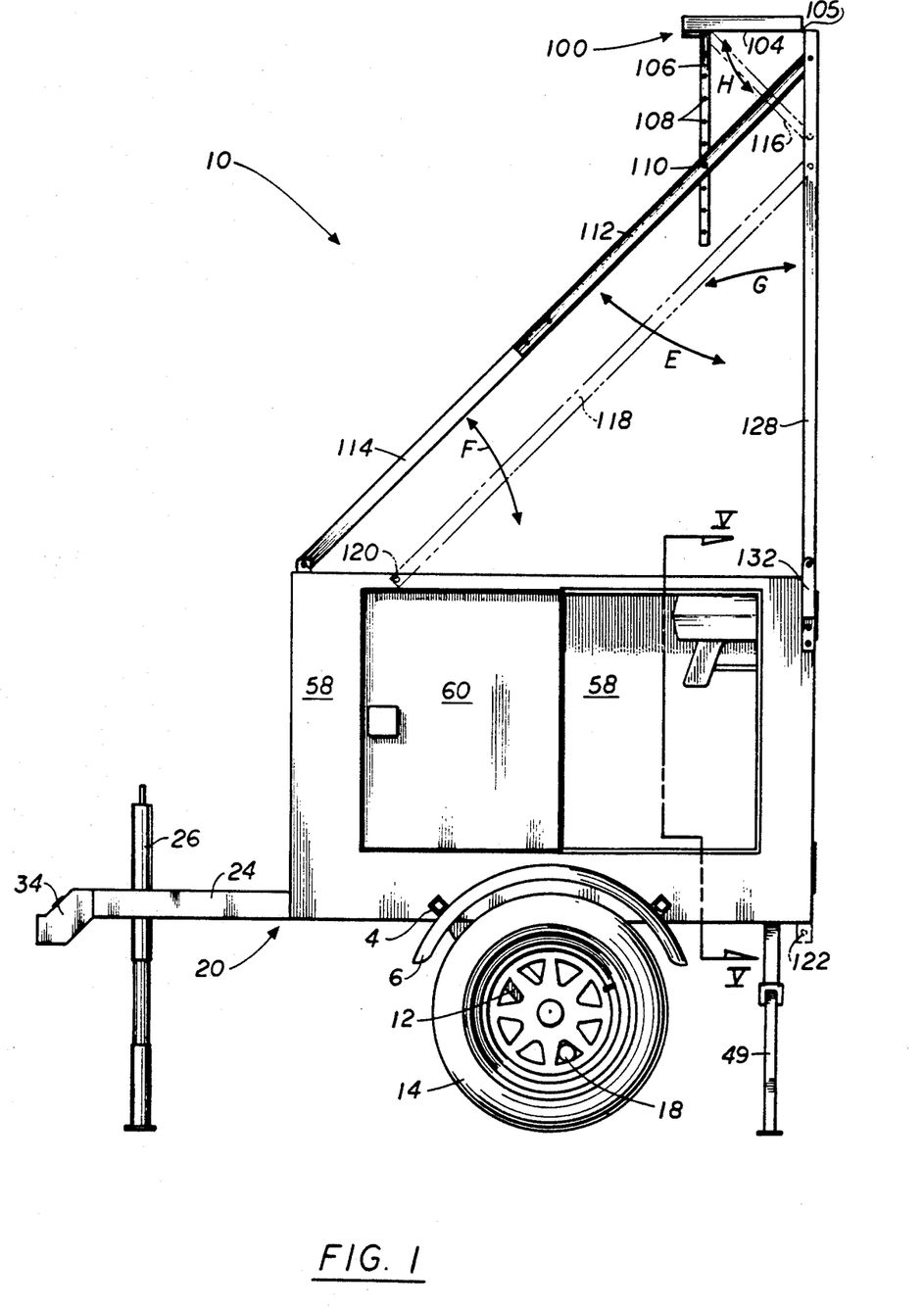
FIG. 1 is a side view of the apparatus according to the present invention in a deployed position.
Figure 4:
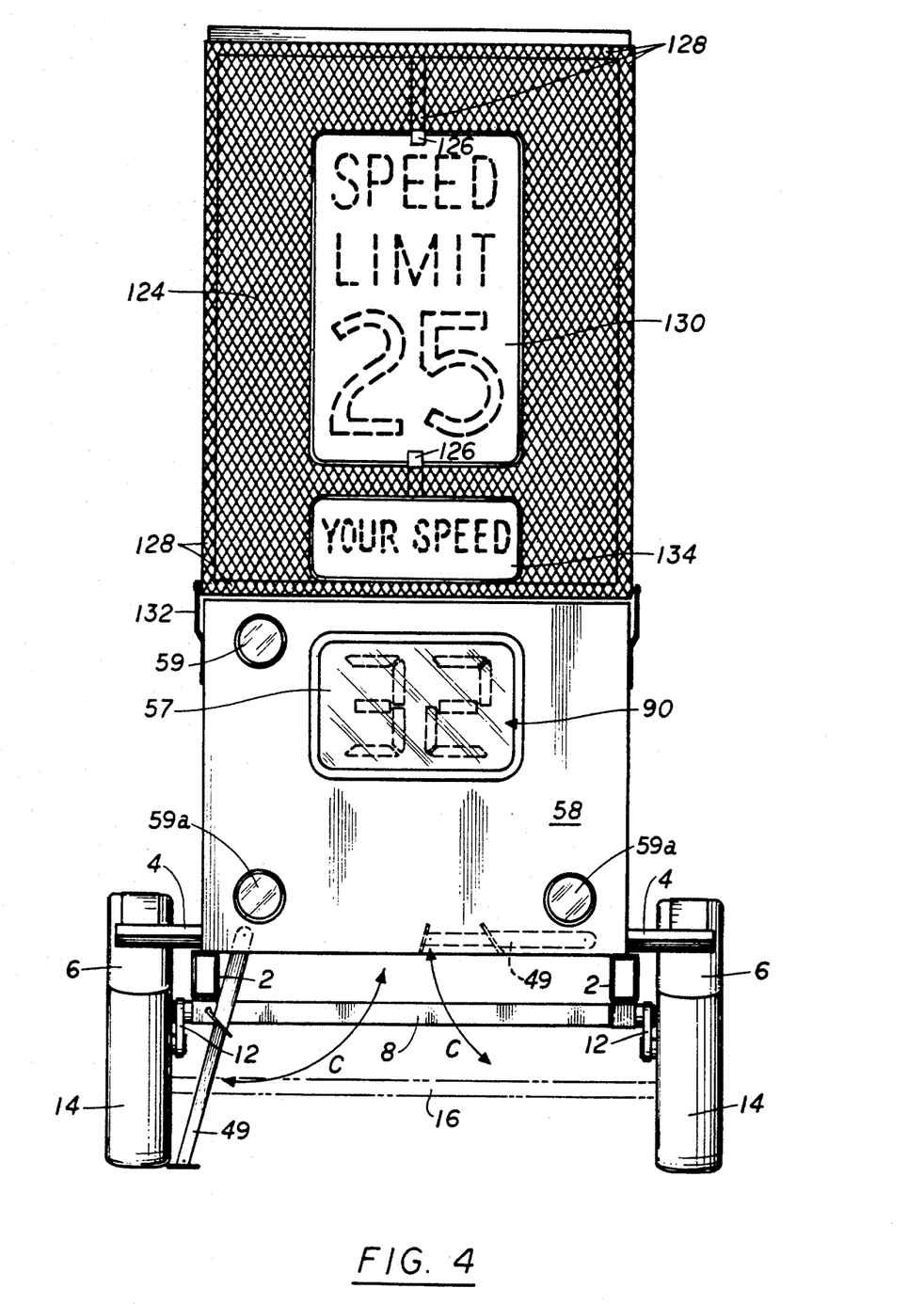
FIG. 4 is an end view of the apparatus according to the present invention.

With respect to FIGS. 1 and 4, a pair of rear legs 49 are deployed at lower rear-most corners of the trailer container 50 which move from a stored position shown in phantom in FIG. 4 to a deployed position shown in FIG. 1 by rotating the rear legs 49 along the direction of the arrow C.

In use and operation, the trailer and its associated speed awareness device 10 is located at a site for deployment and the towing vehicle is uncoupled from the device 10. With the telescoping stand 26 partially supporting the device but with the tongue portion 30 in a lowered position, the rear legs 49 are deployed. Thereafter, the telescoping stand 26 is cranked up by using the crank handle 28 until the wheels are elevated from the ground. Alternatively, the rear legs 49 may be an option in which event the wheels 14 provide the rear support for the device 10. In any event, the wheels 14 can be secured from unauthorized rotation or removal by use of the axle lock 16. When the tongue 30 is removed from the forward portion of the socket 32, a conventional towing ball will not cooperate with the trailer, thereby rendering less likely the trailer 20 will be moved by unauthorized people.

FIGS. 1 through 4 also reflect certain structure with respect to the container 50 which is supported on the trailer frame 20. As mentioned, trailing portions of angle braces 24, tongue brace 22, transverse beams 4 and box beams 2 communicate with various portions of the container. The container itself is formed from two pairs of beams, a pair of transverse beams 52 and longitudinal beams 54 interconnected to form a substantially rectangular frame. A floor 56 is connected to these beams. Extending vertically upwardly from a thusly defined floor, four walls 58 are erected along peripheral edges of this floor and a roof 62 is secured thereto defining a box-shaped container 50. While FIG. 5 suggests the provision of vertically extending support members 61 and associated roof supports 63, since the walls, floor and roof are formed from sheet metal, the device can be integrally formed without the need for this additional bracing by appropriate construction techniques. However, the supporting framework may optionally also be used to provide an extremely strong and rigid structure.

Figure 2:
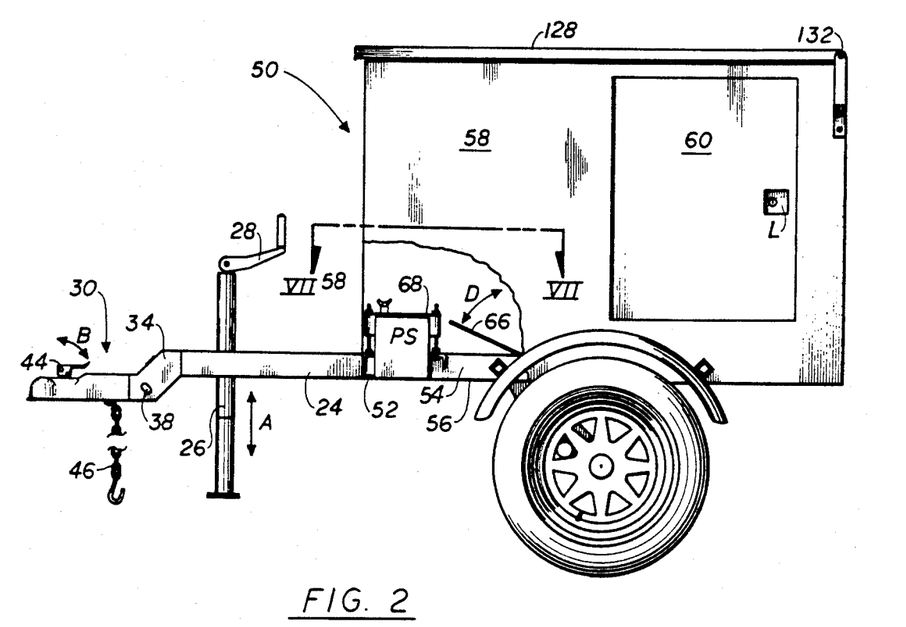
FIG. 2 is a side view similar to FIG. 1 with the device substantially ready for transport, and a fragmented portion to show a certain feature within the interior of the device.
Figures 5, 6, 7:
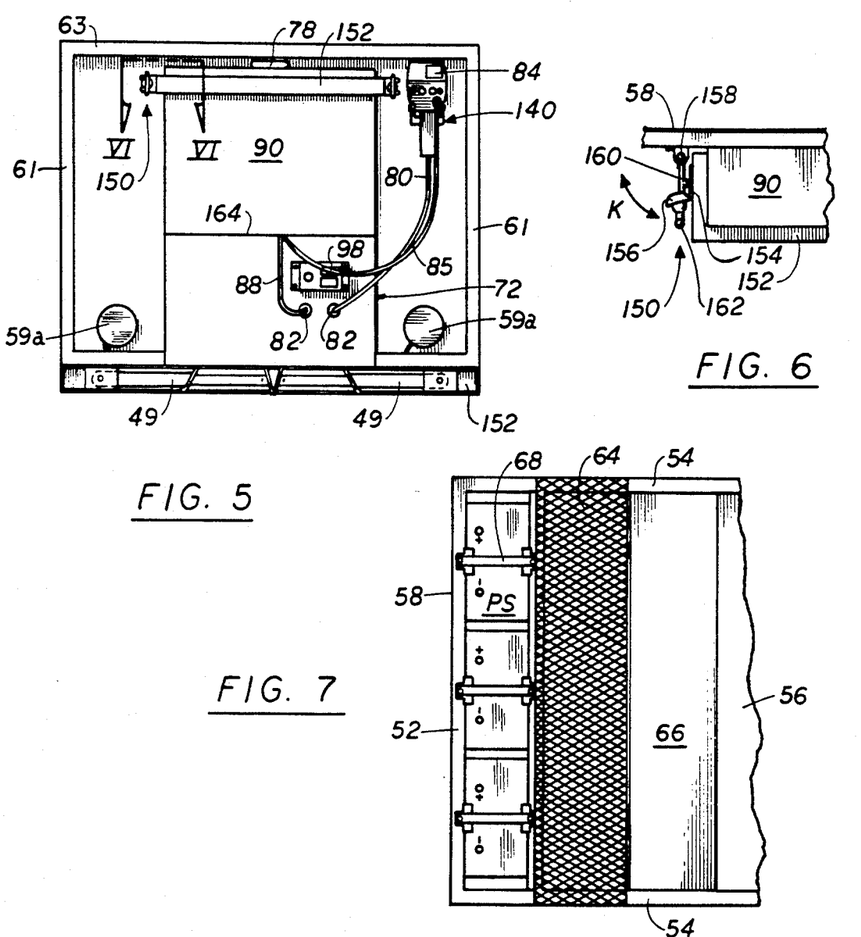
FIG. 5 is a sectional view taken along lines 5—5 of FIG. 1.
FIG. 6 is a sectional view taken along lines 6—6 of FIG. 5.
FIG. 7 is a sectional view taken along lines 7—7 of FIG. 2.

FIGS. 2 and 7 reflect a certain feature associated with the floor 56. Attention is directed to FIG. 7 which shows a mesh 64 defining a portion of the floor just rearwardly of a bank of batteries defining a first power supply PS. A flap 66 is hinged to a non-foraminous floor portion. The mesh 64 serves as a ventilation device to allow "breathing" within the interior of the container without compromising the structural security of the container 50. Because the container has its own power supply which is preferably a 12-volt battery system, ventilation is desirable to preclude the buildup of sulfuric acid within the container. When the device is to be utilized, the flap 66 is opened by a motion along the direction of arrow D where from most points of observation, the existence of the ventilation mesh is not readily discernable. Note that in FIG. 7 a bank of three batteries is displayed which are connected to the interior of the container 50 by means of battery hold-down clamps 68. These clamps are associated with frame members 52 for example for rigidity. Note that at least one side wall 58 is provided with an access portal 60 which is secured to the wall 58 by means of a lock L. Access to the interior of the container 50 is therefore provided through the portal 60.

As mentioned briefly supra, a circuit 70 is used to operatively couple a radar gun 84, a display board 90 and a photo voltaic panel 100. This circuit will now be described to provide a better understanding of subsequent installation details with respect to these components on the device 10. In essence, and with respect to FIG. 9, the circuit 70 uses a 12-volt battery PS at the heart of its system. The battery is connected to a circuit which can be enabled by use of a switch 72 preferably coupled with a fuse and pilot light to respectively protect the system and indicate the status. A first branch 74 extends from the switch and includes a display board light 78 powered by the battery and having a relay switch 76 interposed between the light 78 and the switch 72. The relay switch 76 is enabled by a reading from the photo voltaic panel 100 as will be described. Basically, when the photo voltaic panel is inoperative, as when it is dark outside, the relay switch energizes the display board light which as shown in FIG. 5 provides illumination for passersby so that the display can be read.

Figure 9:
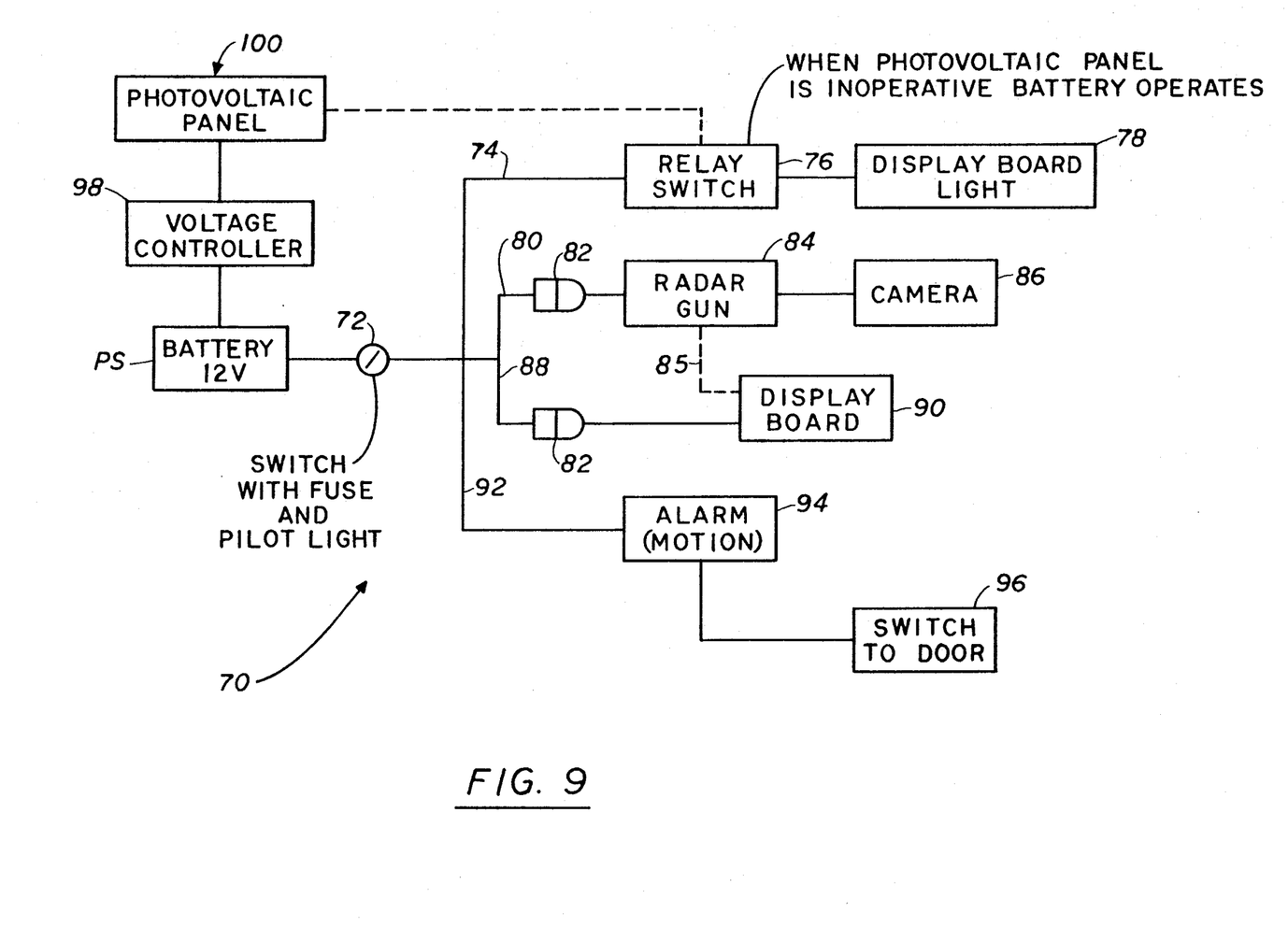
FIG. 9 is a circuit diagram showing the cooperation of the various elements comprised of the invention.

A second branch 80 is connected to the switch 72 and includes a radar gun 84 removeably plugged into the circuit by a plug 82 communicating with the second branch 80. Optionally, a camera 86 can be similarly coupled so that certain observations from the radar gun can be photographed for subsequent evaluation.

A third branch 88 couples the switch 72 with a display board 90. The display board is removeably attached to the third branch 88 by means of a similar plug 82. In addition, the display board communicates with the radar gun 84 by means of a communication link 85 so that perceptions derived from the radar gun are displayed on the board 90.

In addition, a fourth branch 92 couples an optional alarm 94 to the switch 72. One form of alarm 94 would be a motion detector which indicates attempts by vandals for example to upset the device 10. In addition, the alarm may also be coupled to a switch 96 associated with portal 60, incorporating a time lag so that when the door has been opened, a certain amount of time is available to disarm the alarm.

FIG. 9 also shows a schematic of a photo voltaic panel 100 which is coupled as an input to the battery PS through a voltage controller 98. Thus, the voltage controller limits the quantum of electrical energy that the photo voltaic panel delivers to the battery PS. In addition, as mentioned briefly above, a relay switch 76 energizes a display board light 78 when the photo voltaic panel is not processing actinic radiation from the sun. A threshold comparator or its equivalent will indicate when the panel 100 is inoperative, typifying occlusion of the panel from the sun which therefore enables the relay switch 76 lighting the board light 78.

FIGS. 1 through 4 reflect certain important structural features which optimize the utilization of the photo voltaic panel 100. As shown, the panel 100 is supported on a substrate 104 which is connected at one edge by means of a hinge 105 to a structure to be defined. An opposite edge of the substrate 104 is connected to an adjustable link 106 which in the deployed configuration (FIG. 1) depends downwardly. The adjustable link 106 is provided with a plurality of apertures 108 one of which is to be connected through a pin 110 to a two-bar linkage 112, 114. The first link 112 has an associated hole to receive the pin 110 therethrough to fix the angle of attack of the panel 100 with respect to the tracking of the sun, for maximum energy extraction. The first link 112 swings to a stored position by its movement along the direction of the arrow E. The second link 114 which is coupled from the roof 62 to a free end of the first link remote from the panel 100 moves in the direction of the arrow F when folded for storage. An alternative rigid link 116 is shown extending between a forward edge of a substrate 104 and an associated vertical support when tracking the sun at a specific attitude is not an essential feature. In this event, a hinge at 105 is not necessary and the substrate 104 is fixed at a 90° angle with respect to the upstanding member 128 to be described. In addition, an alternate brace 118 extends from the area normally connecting the first link 112 downwardly to a deployment hole 120. The alternate brace 118 is a rigid link having a pin at its lower most end adapted to be placed within the deployment hole 120 for erecting the panel 100. When the panel is to be in a folded stored position, the free end of the alternate brace 118 extends downwardly and straddles opposed side walls 58 of the container 50 so that the brace 118 aligns with a lower storage hole 122 for fixing the panel 100 in a stored position. Thus, the upstanding member 128 and the substrate 104 are a rigid L-shaped structure. This second alternative structure may be desirable when the trailer is moved relatively short distances, the angle of attack with respect to the sun is not critical, and the device is moved sufficiently frequently that the process associated with the first embodiment is not desired.

With particular reference to FIG. 4, a speed limit sign 130 and that which was described as an upstanding support 128 can now be described. A speed limit sign 130 is fixed on a metal sign stand 124 which in turn is supported by a lathe support 128 formed from barstock and oriented so that the support is of substantially rectangular configuration. Note in addition, a vertical sign stand support 128 bisects the speed limit sign 130 and includes a support for clips 126 which can pivot from a position which captures the speed limit sign in a fixed position to one which releases it for replacement of the speed limit sign with another sign having perhaps a different speed limit associated therewith.

The top most edge of the horizontally disposed sign stand support 128 includes the hinge 105 which supports one edge of the photo voltaic panel's substrate 104. A lower most portion of the vertical sign stand supports 128 include a hinge 132 which allows the speed limit sign and its associated support to rotate along the direction of the arrow G when folding the device for storage. Note the presence of an indicia plate 134 also fastened to the sign stand which advises passerbys as to their own speed reflected in the display 90 to be described shortly.

Figure 8:
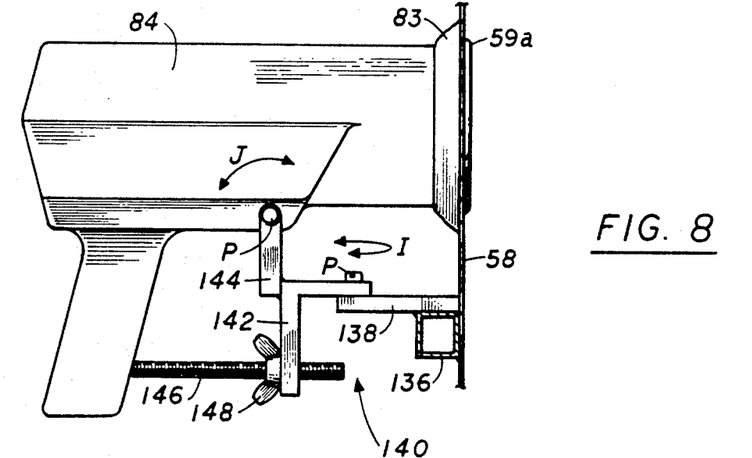
FIG. 8 is a side view of the radar gun disposed in its environment according to the present invention.

As mentioned with respect to FIG. 9, the display 90 receives its stimulus to provide a reading from a radar gun 84. The radar gun 84, contained within the interior of the container 50 is especially supported by means of a radar mounting bracket 140 shown in FIG. 8 in detail. Specifically, a ledge 136 is fastened on an inner surface of the rear wall 58 and supports a shelf 138 which extends inwardly. The shelf has a top surface upon which is lapped an inverted L-shaped pivot plate 142. The plate 142 is connected to the shelf 138 by means of a first pivot P so that the plate 142 can rotate along the direction of the double-ended arrow I. The juncture of a horizontal and vertical leg defining the inverted L-shaped pivot plate 142 supports an upwardly extending barrel support 144. An upper extremity of the barrel support 144 is formed as a yoke which carries the barrel of the radar gun 84 as shown. The yoke is fastened to the barrel of the radar gun 84 by means of a second pivot P which allows rotation of the radar gun along the direction of the arrow J. The gun 84 is held in a fixed position by means of a threaded adjustor 146 which passes through the free end of the vertical leg of the pivot plate 142. The threaded adjuster 146 includes a locking wing nut 148 oriented to abut against the pivot plate where axial extension of the adjuster 146 fixes the gun 84 in position along an appropriate point on the arc indicated by the arrow J. Collectively, these two pivot points allow articulation of the gun 84 to allow it to focus on a stream of bypassing traffic to allow a reading to be placed on the display 90 which is temporally and spatially relevant to the passing vehicle, so that the displayed number correlates with the specific vehicle's actual speed.

FIGS. 5 and 6 reflect certain structure with respect to the display 90 and more specifically the associated display support 150. In order to have the display 90 register with a window pane 57 incorporated in a rear wall 58 of the compartment, the display 90 is first supported on a lower ledge 164. A top most edge of the display 90 is secured to an inner surface of the rear wall 58 by means of a substantially U-shaped bracket 152 which presses the display 90 towards the rear wall. The bracket 152 fixes to the rear wall by means of a fork 154 affixed to an outer edge of each of the free ends of the U-shaped bracket and co-acts with a stop member 156 which is straddled by the fork 154. The stop 156 communicates with the rear wall 58 by means of a hinge 158 fastened to the wall and supporting a shock cord 160 which is integrally formed with the stop 156. A handgrip 162 extends from an end of the stop remote from the shock cord and allows a purchase area for rotation of the shock cord in the direction of the double-ended arrow K to selectively remove the stop 156 from the fork 154.

A light 78 is strategically placed adjacent a top edge of the display 90 so that its illumination will shine between the display 90 and the window 57 formed in the rear wall 58 of the container 50. As mentioned with respect to the circuit of FIG. 9, this light 78 is actuated by monitoring the ability of the photo cell 100 to extract energy from the sun's rays. Note also that the rear wall 58 includes a transparency 59 in the upper left hand corner which corresponds with the placement of the radar gun 84. It is preferred that this transparency merely be transparent to the radar signal, and not necessarily visually transparent. Thus, a smoked glass can be used. In addition, a pair of lenses 59a are deployed at lower most corners of the rear wall 58. The placement of these lenses corresponds to the traditional configuration associated with light bulbs placed therebehind to indicate, braking, turn signals, etc. The wiring details with respect to these lights have been omitted since they and their associated wiring harness which coupled to the towing vehicle are traditionally required for trailers. Note that when the camera 86 of FIG. 9 is to also be utilized, an additional transparency may be used behind which the camera is placed, within the interior of the container 50. This allows a permanent record to be made of selected vehicles, for example those exceeding the speed limit. The film associated with the camera and the camera structure itself can have the radar information superimposed on the film along with the time and date, as is known for commercially available surveillance cameras. The camera can be selectably energized upon receiving the appropriate stimulus from the radar 84.

In use and operation, the device 10 is positioned at a strategic area adjacent a roadway, and the speed limit sign 130 is suitably erected as described supra. This also allows the photo voltaic panel 100 to be deployed. The trailer hitch is removed from the vehicle and stored within the interior of the container, and the rear legs 49 are then deployed. The telescoping stand is adjusted for the appropriate elevation, and if desired the wheels 14 are either elevated and/or disabled by means of the axle lock 16, secured with the padlock 18. Various instrumentalities, e.g. speed limit signs 130 that relate to different posted speed limits, the trailer coupling instrumentalities such as the removable portion of the hitch 44 are stored within the interior. The switch 72 is enabled which operates the four branches of the circuit of FIG. 9 as discussed supra. The radar gun 84 is appropriately oriented to observe passing vehicles at an appropriate distance through the radar mounting bracket 140, and the device is ready to operate. The portal 60 is locked thereby securing the contents within the interior of the device 10, and the device can be left unattended to provide an indicator to passing traffic as to the relative speed.

Moreover, having thus described the invention it should be apparent that numerous structural modifications and adaptations may be resorted to without departing from the scope and fair meaning of the instant invention as delineated here and above and as claimed here and below.

I claim:
1. A speed monitoring and display system, comprising, in combination:
 a wheeled trailer which supports a container thereon,
 a display board on a trailing portion of said container, providing a reading of passing traffic speed to passing drivers, a radar gun monitoring passing traffic and operatively coupled to said display board, and a source of power to drive said radar gun and said display board;

wherein said container is formed as a substantially box shaped hollow member, said display board is supported on an inner surface of a rear wall of said container, a window is strategically placed on said rear wall oriented to allow said display board to provide visual indicia to passing traffic, and a transparency mounted in said rear wall behind which and within said container said radar gun is placed, said transparency allowing signals from said radar gun to monitor passing traffic; and wherein said wheeled trailer is formed from a framework having a forward portion defining a trailer tongue which coupled to a vehicle for towing said system to various locations, said tongue including a removable trailer hitch which coupled to the towing vehicle and is fixed on a leading portion of said tongue by means of a sleeve integrally formed with said hitch, said sleeve telescopically insertable within a socket contained on a leading portion of said tongue and fixed thereto with locking means, whereby when not in use, said hitch can be removed from said leading portion of said tongue and placed within said container for storage to reduce the likelihood of unauthorized trailer transport.

2. The system of claim 1 wherein said radar gun is supported on said rear wall at an interior surface thereof by means of a mounting bracket including a ledge; interiorly from said ledge, an inverted L-shaped bracket pivotally connected to a shelf extending from said ledge and supporting a vertically upstanding support for a barrel of the radar gun, and a threaded adjustor extending between a handle area of the radar gun and a lower most portion of said L-shaped bracket to adjust the gun in scanning the roadway for appropriately focusing on traffic passing thereby, whereby passing traffic can receive input from said display board.

3. The system of claim 2 wherein said container includes a bottom floor surface which has a mesh portion adjacent said source of power, said mesh portion underlying a flap pivotally connected to said floor allowing ventilation into an interior of said container unobtrusively, to allow said source of power to breathe.

4. The system of claim 3 wherein a speed limit sign is connected to sign stand carried on the intersection of a top surface and said rear wall of said container, to provide visual comparison for a passing vehicle between the vehicle's actual speed and the maximum permissible speed for a given roadway, said sign stand foldable from a vertically disposed deployed position to a substantially horizontally oriented position on top of said top surface of said container, and photoelectric means on an edge of said sign stand remote from said rear wall to provide a second power source.

5. A mobile speed awareness device, comprising, in combination:

a trailer supporting speed indicating means apprising passing traffic of traffic speed, a posted speed limit sign, means for removably connecting said sign to said trailer, a trailer tongue removably connected to said trailer, and free standing means for temporarily immobilizing said trailer in one location;

wherein said speed indicating means includes a radar source for monitoring bypassing traffic speed carried on said trailer, a display means operatively coupled to said radar source for receiving speed related signals therefrom, a source of power to operate both said display means and said radar source, whereby bypassing traffic can compare the speed of the vehicle with the posted speed limit sign;

wherein said speed indicating means is encapsulated within a container supported on said trailer for security; and wherein said means for removably connecting said trailer tongue includes a trailer hitch having a sleeve which telescopes within a leading edge socket of said trailer tongue, a pin coupling said hitch and tongue together at said socket and sleeve area, whereupon after removal of said trailer tongue, said mobile speed awareness device cannot be transported by a conventional ball-type trailer hitch.

6. The device of claim 5 wherein said free-standing means includes a pair of legs adjacent a rear portion of said trailer deployable from a stored to a downwardly extending position, and a forwardly disposed telescoping stand depending from a tongue portion and vertically extensible to support said trailer between said rear legs and said stand.

7. The device of claim 6 wherein said trailer is towed from various deployment areas and includes a pair of road contacting wheels, said wheels capable of being locked into position by means of an axle lock extending between said wheels to preclude unauthorized removal.

8. The device of claim 7 wherein said radar source and said display means are secured within said container carried on said trailer, a photo voltaic energy transfer medium is disposed on a top surface of said container, said source of power includes a battery power pack contained within an interior of said container, means for coupling said sources together to drive said radar source and display means, whereby said trailer is self-contained for monitoring traffic.

9. A velocity indicator, comprising, in combination:

a trailer containing velocity indicating means, a container placed on said trailer having an access portal, a display board mounted on a window in an interior of said container with a display board face exposed to an exterior of said container through said window, velocity sensing means mounted near said display board and monitoring passing traffic through a container transparency, and a source of power coupling said sensing means to said display board to exhibit sensed velocity to the traffic being monitored;

wherein said source of power includes a plurality of batteries contained within said container and communicating with ventilation means associated with said container for breathing; and wherein a photo voltaic panel provides a power input to said batteries and is controlled as to its voltage when feeding said batteries through voltage controlling means, said photo voltaic panel monitored as to the presence of actinic radiation whereupon in its absence, a light oriented to shine on said display board will be energized thereby.

10. The indicator of claim 9 wherein said photo voltaic panel is carried above a top surface of said container and is supported by link means pivoted between said photo voltaic panel and a top surface of said container to allow folding of said photo voltaic panel for storage adjacent a top surface of said container.

11. The indicator of claim 10 wherein said velocity sensing means includes a radar gun mounted within an interior of said container by means of a mounting bracket that allows rotation of said gun about a vertical axis and a horizontal axis for aligning said radar gun sufficiently along a road pathway to allow passing traffic to read a posted speed on said display board face of their own speed by easily addressing said board display face.

12. A speed monitoring and display system, comprising, in combination:
a wheeled trailer which supports a container thereon,
a display board on a trailing portion of said container, providing a reading of passing traffic speed to passing drivers,
a radar gun monitoring passing traffic and operatively coupled to said display board,
and a source of power to drive said radar gun and said display board; and
wherein said wheeled trailer is formed from a framework having a forward portion defining a trailer tongue which couples to a vehicle for towing said system to various locations, said tongue including a removable trailer hitch which couples to the towing vehicle and is fixed on a leading portion of said tongue by means of a sleeve integrally formed with said hitch, said sleeve telescopically insertable within a socket contained on a leading portion of said tongue and fixed thereto with locking means, whereby when not in use, said hitch can be removed from said leading portion of said tongue and placed within said container for storage to reduce the likelihood of unauthorized trailer transport.

13. A mobile speed awareness device, comprising, in combination:
a trailer supporting speed indicating means appraising passing traffic of traffic speed,
a posted speed limit sign,
means for removably connecting said sign to said trailer,
a trailer tongue removably connected to said trailer,
and free standing means for temporarily immobilizing said trailer in one location; and
wherein said means for removably connecting said trailer tongue includes a trailer hitch having a sleeve which telescopes within a leading edge socket of said trailer tongue, a pin coupling said hitch and tongue together at said socket and sleeve area, whereupon after removal of said trailer tongue, said mobile speed awareness device cannot be transported by a conventional ball-type trailer hitch.

14. A speed monitoring and display system which is transported by a prime mover vehicle to a site to be monitored and apprises passing cars of their speed, comprising, in combination:
a wheeled trailer which removably couples to the vehicle and supports a container thereon,
a display board on a trailing interior portion of said container, providing a reading of passing traffic speed to passing drivers,
a radar gun monitoring passing traffic and operatively coupled to said display board within said container,
and a source of power to drive said radar gun and said display board whereby passing car traffic receives speed data and said trailer can be recoupled to the vehicle for redeployment;
wherein said radar gun is supported on a near wall of said container at an interior surface thereof by means of a mounting bracket including a ledge; interiorly from said ledge, an inverted L-shaped bracket pivotally connected to a shelf extending from said ledge and supporting a vertically upstanding support for a barrel of the radar gun, and a threaded adjustor extending between a handle area of the radar gun and a lower most portion of said L-shaped bracket to adjust the gun in scanning the roadway for appropriately focusing on traffic passing thereby, whereby passing traffic can receive input from said display board.

15. The system of claim 14 wherein said container is formed as a substantially box shaped hollow member, said display board is supported on an inner surface of a rear wall of said container, a window is strategically placed on said rear wall oriented to allow said display to provide visual indicia to passing traffic, and a transparency mounted in said rear wall behind which and within said container said radar gun is placed, said transparency allowing signals from said radar gun to monitor passing traffic.

16. The system of claim 15 wherein said container includes a bottom floor surface which has a mesh portion adjacent said source of power, said mesh portion underlying a flap pivotally connected to said floor allowing ventilation into an interior of said container unobtrusively, to allow said source of power to breathe.

17. A speed monitoring and display system which is transported by a prime mover vehicle to a site to be monitored and apprises passing cars of their speed, comprising, in combination:
a wheeled trailer which removably couples to the vehicle and supports a container thereon,
a display board on a trailing interior portion of said container, providing a reading of passing traffic speed to passing drivers,
a radar gun monitoring passing traffic and operatively coupled to said display board within said container,
and a source of power to drive said radar gun and said display board whereby passing car traffic receives speed data and said trailer can be recoupled to the vehicle for redeployment;
wherein a speed limit sign is connected to a sign stand carried on the intersection of a top surface and said rear wall of said container, to provide visual comparison for a passing vehicle between the vehicle's actual speed and the maximum permissible speed for a given roadway a lathe foldable from a vertically disposed deployed position to a substantially horizontally oriented position on top of said top surface of said container, and photoelectric means on an edge of said lathe remote from said rear wall to provide a second power source.

18. The system of claim 17 wherein said container is formed as a substantially box shaped hollow member, said display board is supported on an inner surface of a rear wall of said container, a window is strategically placed on said rear wall oriented to allow said display board to provide visual indicia to passing traffic, and a transparency mounted in said rear wall behind which and within said container said radar gun is placed, said transparency allowing signals from said radar gun to monitor passing traffic.

19. The system of claim 18 wherein said radar gun is supported on said rear wall at said inner surface thereof by means of a mounting bracket including a ledge; interiorly from said ledge, an inverted L-shape bracket pivotally connected to a shelf extending from said ledge and supporting a vertically upstanding support for a barrel of the radar gun, and a threaded adjustor extending between a handle area of the radar gun and a lower most portion of said L-shaped bracket to adjust the gun in scanning the roadway for appropriately focusing on traffic passing thereby, whereby passing traffic can receive input from said display board.

20. The system of claim 19 wherein said container includes a bottom floor surface which has a mesh portion adjacent said source of power, said mesh portion underlying a flap pivotally connected to said floor allowing ventilation into an interior of said container unobtrusively, to allow said source of power to breathe.

* * * * *

UNITED STATES PATENT AND TRADEMARK OFFICE
CERTIFICATE OF CORRECTION

PATENT NO. : 5,231,393
DATED : July 27, 1993
INVENTOR(S) : Bill F. Strickland

It is certified that error appears in the above-indentified patent and that said Letters Patent is hereby corrected as shown below:

Column 8, line 63, after "a" delete "lathe" and substitute --sign stand-- therefor.

Column 11, claim 1, line 17, after "which" delete "coupled" and substitute --couples-- therefor.

Column 11, claim 1, line 19, after "which" delete "coupled" and substitute --couples-- therefor.

Signed and Sealed this

Fifth Day of July, 1994

*Attest:*

BRUCE LEHMAN

*Attesting Officer*      *Commissioner of Patents and Trademarks*